United States Patent [19]

Török

[11] 4,258,415
[45] Mar. 24, 1981

[54] APPARATUS FOR SUPPLYING CURRENT OF CHANGING POLARITY TO A LOAD OBJECT

[75] Inventor: Vilmos Török, Lidingö, Sweden

[73] Assignee: ASEA Aktiebolag, Vesteras, Sweden

[21] Appl. No.: 4,787

[22] Filed: Jan. 19, 1979

[30] Foreign Application Priority Data

Jan. 27, 1978 [SE] Sweden .................................. 7801010

[51] Int. Cl.³ .............................................. H02M 7/00
[52] U.S. Cl. ........................................ 363/64; 363/135; 318/722
[58] Field of Search ............... 318/701, 711, 722, 723, 318/798–803, 807–811, 138; 363/37, 64, 135, 136

[56] References Cited

U.S. PATENT DOCUMENTS

| | | | |
|---|---|---|---|
| 3,121,832 | 2/1964 | Haskell et al. ................. | 318/701 X |
| 3,497,784 | 2/1970 | Toth et al. ..................... | 363/37 X |
| 3,551,632 | 12/1970 | Geisel ........................... | 363/37 X |
| 3,958,173 | 5/1976 | Christian et al. .............. | 363/64 |
| 3,995,203 | 11/1976 | Torok ............................ | 310/163 X |
| 4,066,938 | 1/1978 | Turnbull ........................ | 363/37 X |
| 4,086,622 | 4/1978 | Vukasovic ..................... | 363/37 |

FOREIGN PATENT DOCUMENTS

| | | | |
|---|---|---|---|
| 738300 | 10/1955 | United Kingdom ................ | 363/64 |
| 264529 | 5/1970 | U.S.S.R. ........................... | 363/64 |

*Primary Examiner*—William M. Shoop
*Attorney, Agent, or Firm*—Pollock, Vande Sande & Priddy

[57] ABSTRACT

An improved current supply apparatus for at least one load object capable of delivering reactive power. A DC current source is connected to at least two parallel circuit branches that each include a thyristor connected in series to a winding of an interphase transformer inductor. The ends of the load object are connected to an associated tap point intermediate the thyristor and inductor winding of each branch. The thyristors are successively ignited to conduct current during a portion of a current supply cycle to provide an output current of changing polarity to the load object.

10 Claims, 6 Drawing Figures

APPARATUS FOR SUPPLYING CURRENT OF CHANGING POLARITY TO A LOAD OBJECT

BACKGROUND OF THE INVENTION

The invention relates to a current supply apparatus for a load object, and, more particularly, to such an apparatus including means for periodically changing the polarity of the current that is supplied to the load object.

It is known to the art to supply current of periodically changing polarity to the windings of a synchronous machine to operate the machine. For example, in the U.S. Pat. No. 3,995,203, at FIG. 7 there is shown a reluctance machine having a power winding that is supplied with driving current from a DC current source. The winding has a center tap and the end of the windings are connected to the DC current source through thyristors.

The thyristors are operated to periodically conduct and to thereby change the direction of flow of the driving current through one-half of the winding. Since only one half of the winding is used to carry current at one time, the winding is not utilized in an efficient manner.

FIG. 8 of the above prior art patent shows a bridge circuit having four thyristors for supplying alternating current to the winding of a synchronous machine. In operation, pairs of diagonally opposite thyristors are operated to alternately conduct to periodically change the direction of flow of current in the associated power winding. However, such a power supply apparatus is necessarily complicated and expensive since four thyristors having associated cooling bodies, fuses, control devices and overvoltage protection devices are required to operate to supply the alternating current to the power winding.

Accordingly, it is an object of the invention to provide a relatively simple and efficient apparatus for supplying current of changing polarity to the power windings of a synchronous machine.

Another object of the invention is to provide such an apparatus wherein a minimum number of switching elements are used to change the direction of flow of the supply current and to pass the supply current through an entire power winding to efficiently utilize the winding.

A further object of the invention is to provide an improved current supply apparatus wherein a single thyristor is used to provide current for each phase of a multi-phase load object.

Another object of the invention is to provide an improved current supply apparatus wherein current smoothing elements in a supplying DC circuit are either reduced in size or eliminated.

These and other objects of the invention will become apparent from a review of the detailed specification which follows and a consideration of the accompanying drawings.

BRIEF SUMMARY OF THE INVENTION

In order to achieve the objects of the invention and to overcome the problems of the prior art, the improved current supply apparatus, according to the invention, includes supply equipment for supplying current of alternating polarity to a load object capable of supplying reactive power.

The supply equipment includes power terminals that are connected to a DC current source. At least two parallel circuit branches are positioned between the power terminals and each circuit branch includes a switching element, for example a thyristor, connected in series with one of at least two magnetically coupled windings of an interphase transformer inductor.

The ends of a load object are connected to associated tap points located between the thyristor and associated inductor winding of each parallel branch.

The interphase transformer inductor may include a core having legs for holding the windings of the inductor and an additional leg having air gap. The additional leg may also have an associated winding.

DETAILED DESCRIPTION OF PREFERRED EMBODIMENTS

Figure 1:
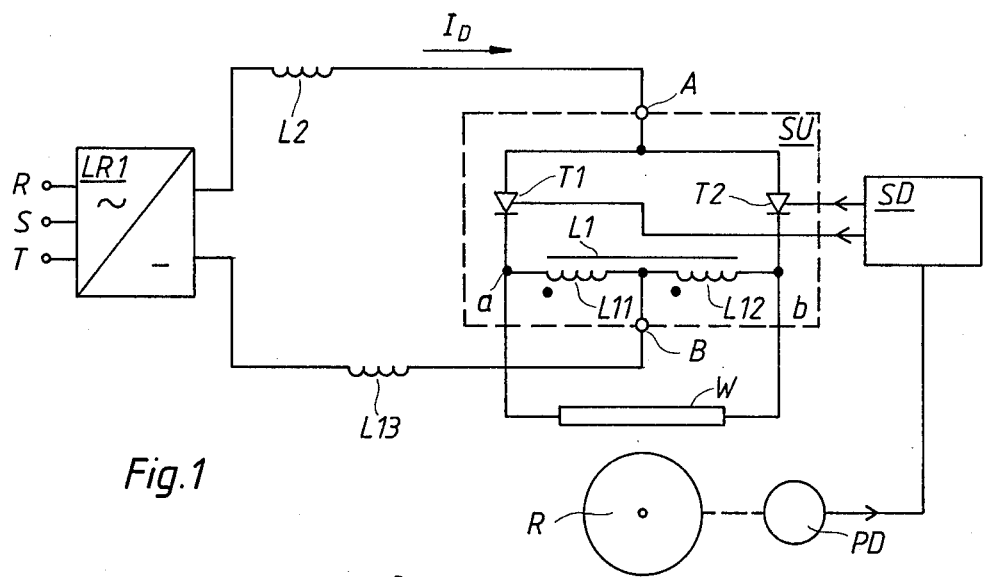
FIG. 1 shows a circuit diagram of an embodiment for supplying current of alternating polarity to a power winding of a synchronous machine.

FIG. 1 shows an embodiment of the invention for supplying current of alternating polarity to a synchronous machine, for example, a reluctance machine, having a power winding W and a rotor R. A current source is provided to supply current to a supply apparatus SU at a rate that is essentially independent of variations in the impedance and the back e.m.f. of the power winding W.

The current source of FIG. 1 includes a controllable rectifier LR1 and a smoothing inductor L2. The rectifier may, for example, comprise a three-phase thyristor bridge, that is supplied from a three-phase network, R, S, T. Of course, the magnitude of the direct supply current $I_D$ may be set at a desired value by varying the DC output voltage of the rectifier.

It should also be appreciated that the operation of such a current source-supplied machine is different than the operation of a machine supplied by a voltage source.

The current source is connected to supply connections A and B and two parallel circuit branches of the supply equipment SU are connected between the supply connections A and B. Each circuit branch includes a thyristor, for example T1 or T2, that is connected in series with an associated winding, for example L11 or L12, of an interphase transformer inductor L1. A first load tap a is provided at a point intermediate the thyristor T1 and an end of the associated winding L11 and a second load tap b is located between the thyristor T2 and winding L12. A load object, for example a power winding W is connected between the taps a and b.

The synchronous machine has a rotor R that is connected to a rotor position transducer PD, for example a commutation switch. The transducer is used in a manner known to the art to provide output signals corresponding to the position of the rotor. The output signals of the transducer PD are applied to a control pulse device SPD that generates corresponding ignition signals for thyristors T1 and T2 in a manner known to the art. Thus, the thyristors T1 and T2 are ignited in a sequence corresponding to the changing position of the rotor R and an alternating supply current is thereby generated and applied to at least the power winding W to drive the synchronous machine. The thyristors T1 and T2 may be turned off or caused to commutate by utilizing the voltage that is induced in the winding W in a manner known to the art or controlling the rectifier LR1 to periodically reduce the current $I_D$ to zero. Circuits of this kind, and this manner of operation, are known through for instance the above-mentioned U.S. Pat. No. 3,995,203 and the published Swedish patent application Ser. No. 401 758. Thus, only one thyristor will be turned on at a time to cause a current of a particular polarity to flow through the entire power winding W.

The two windings L11 and L12 of the interphase transformer inductor L1 are magnetically coupled and therefore, the windings L11 and L12 will at all times (with the exception of the excitation current of the inductor) carry current of the same magnitude ($I_D/2$) in an inward direction towards a center tap of the inductor L1. An equally great current having a polarity that changes in time with the ignition frequency of the thyristors will flow through the power winding W. The voltage drop across the winding W is divided, with half of the voltage on each of the windings L11 and L12.

Figure 2:
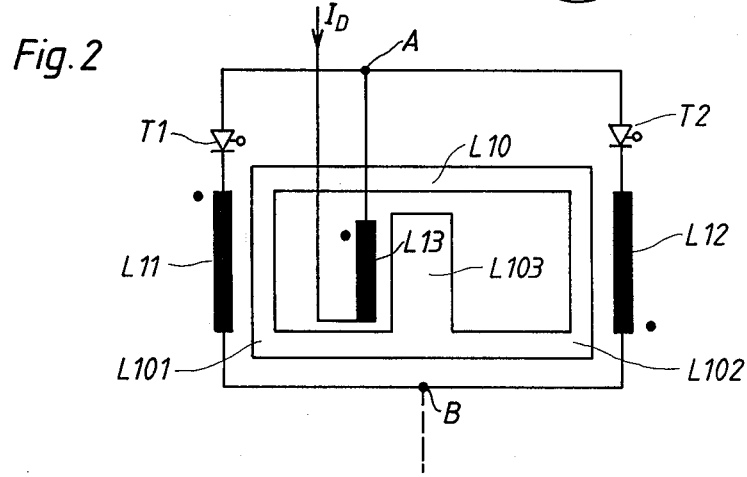
FIG. 2 shows a circuit diagram of the interphase inductor of FIG. 1 with means for providing a smoothing inductor function.

FIG. 2 shows how the two windings L11 and L12 are arranged on a common core L10. According to one embodiment of the invention, the core may be provided with two legs L101 and L102 that each have a winding and at least a third leg L103 having an air gap. The magnetomotive force (mmf) from the windings L11 and L12 will cooperate to drive a flux through the third leg L103 and the combined mmf of the windings will correspond to the total current $I_D$ in the windings L11 and L12. As will be understood by those skilled in the art, the interphase transformer inductor will act as a smoothing inductor for the direct current $I_D$. The smoothing function may be further strengthened by providing a winding L13 for the leg L103 and connecting the winding L13 to be traversed by the current $I_D$, as shown in FIG. 1. If the winding L13 is provided, the smoothing inductor L2 may be reduced in size or even eliminated, thereby simplifying the construction and reducing the cost of the apparatus of the invention.

Figure 3:
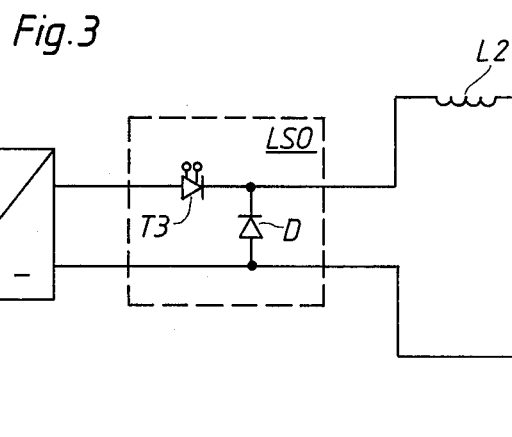
FIG. 3 shows a circuit diagram of an alternative of a DC current source for the apparatus of the invention.

FIG. 3 shows how supply equipment SU, according to the invention, may be supplied with direct current in a manner different from that shown in FIG. 1. In FIG. 3 a diode bridge LR2 is supplied from a network R, S, T and provides a DC voltage to a DC converter LS0. The converter LS0 includes a free-wheeling diode D and a thyristor T3 having a turn-off means that is known to the art. The thyristor T3 may be periodically turned on and off to control the current $I_D$ in a manner known to the art.

Figure 4:
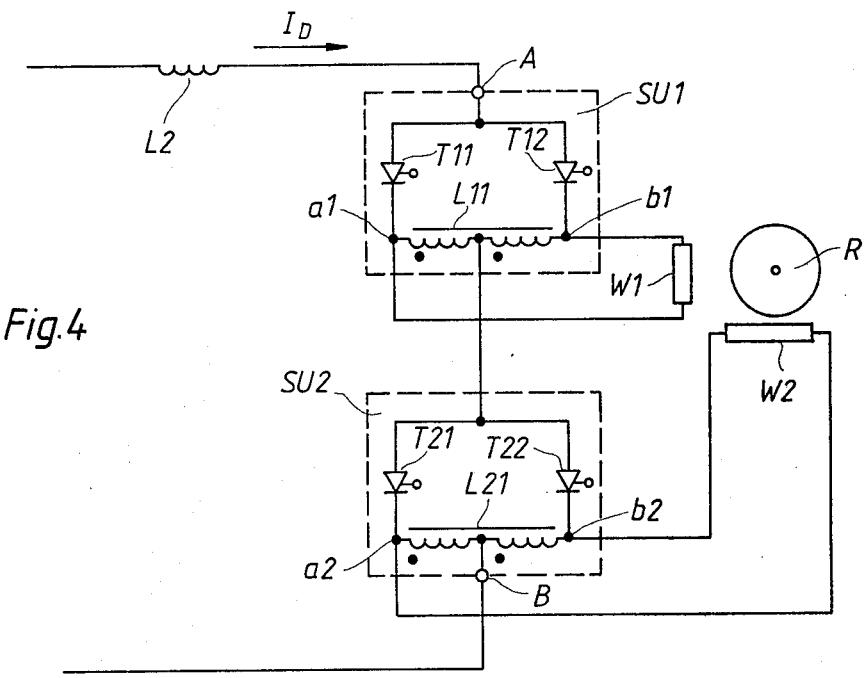
FIG. 4 shows a circuit diagram of an embodiment of the invention for supplying current to at least two load objects.

FIG. 4 shows an embodiment for supplying a plurality of load objects, for example power windings W1 and W2 of a synchronous machine. The supply equipment comprises two "partial connections" SU1 and SU2 having elements that are connected in the manner described for the embodiment of FIG. 1. SU1 and SU2 are connected in series and are connected to the DC current source through supply connections A and B. The partial connection SU1 supplies a power winding W1 and the connection SU2 supplies another power winding W2 of a synchronous machine having a rotor R. Of course, additional partial connections may be connected in series to supply driving current to additional power windings.

Figure 5:
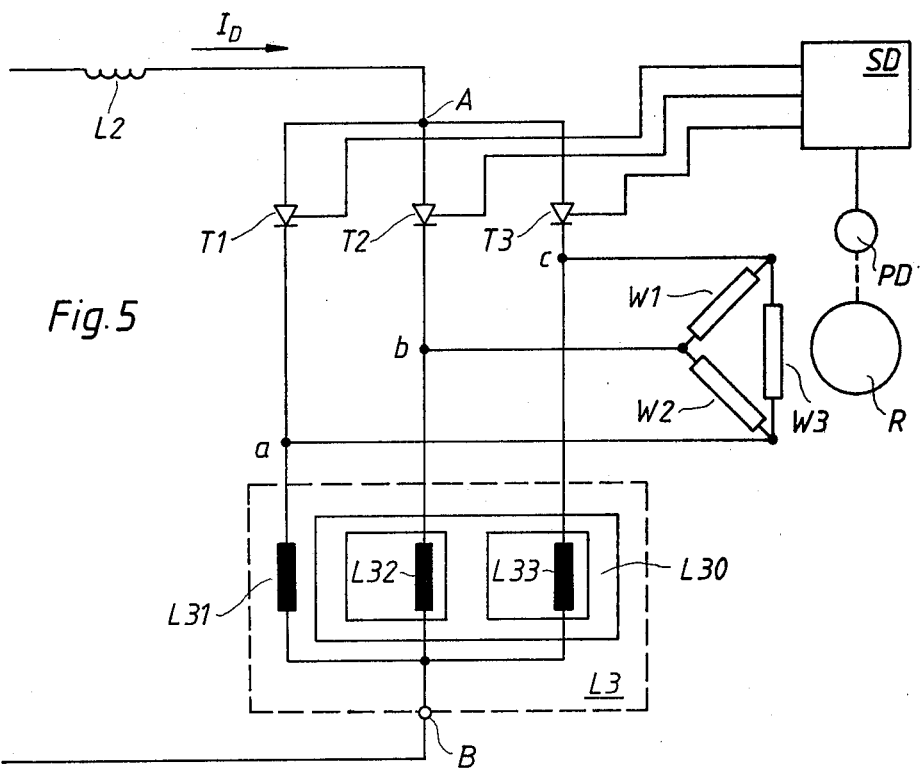
FIG. 5 shows a circuit diagram of an embodiment of the invention for supplying a multi-phase load object.

FIG. 5 shows an alternative embodiment that may be used to supply a three-phase load object, for example three delta-connected windings W1, W2 and W3 of a synchronous machine having the rotor R. Three thyristors T1, T2 and T3 are connected in series with associated windings L31, L32 and L33 that are disposed on the legs of an interphase transformer inductor L3 having a core L30. Load terminals a, b and c are located between corresponding thyristors T1, T2 and T3 and associated windings L31, L32 and L33 and are connected to the power windings of the load object.

The thyristors T1, T2 and T3 are successively ignited by a control device SD, that is operated by a position transducer PD connected to the rotor R. Each thyristor conducts for one-third of a current supply cycle to supply current to the load object. It should be understood that the embodiment of FIG. 5 operates in other respects in the same manner as was described for the embodiment of FIG. 1.

It should be understood that the load object of FIG. 5 may include power windings arranged in a different manner, for example the load object may be connected in a star formation. Also, the inductor L3 may be designed in a different fashion, for example the inductor may be provided with a short-circuited delta winding to reduce leakage fluxes. Moreover, the embodiment of FIG. 5 may be extended to supply any number of phases by including a separate parallel thyristor/inductor branch for each additional phase.

Figure 6:
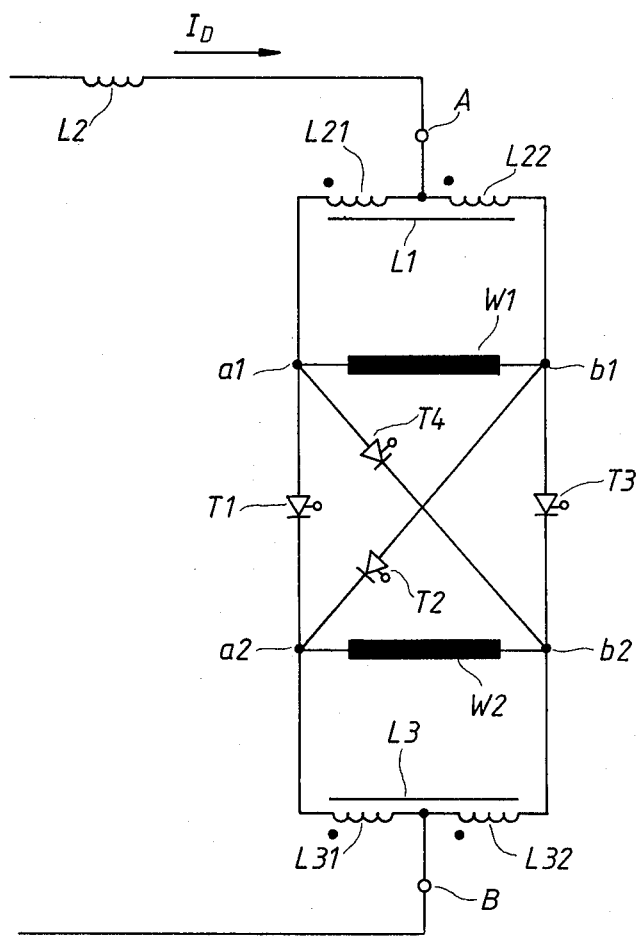
FIG. 6 shows a circuit diagram of an alternate embodiment of the invention for supplying two load objects.

FIG. 6 shows one further embodiment of the equipment according to the invention. Two interphase transformer inductors L1 and L3 are connected with their center taps to associated connections A and B. The equipment includes a first parallel branch having windings L21 and L31 and a thyristor T1 and a second branch having windings L22 and L32 and a thyristor T3. Power windings W1 and W2 are connected across the parallel branches on either side of the thyristors T1 and T3 between respective pairs of load taps a1, b1 and a2, b2.

The equipment includes a thyristor T2 connected between taps b1 and a2 and a thyristor T4 connected between taps a1 and b2. The thyristors T1-T4 are ignited in succession, for example in the series T1-T2-T3-T4, preferably with equal intervals between consecutive ignitions, and each thyristor is operated to conduct for one-fourth of a current supply cycle. Thus, a current of alternating polarity is caused to flow in the load objects W1 and W2, and the currents through W1 and W2 are mutually offset in phase by 90°. Of course, the thyristors T1-T4 may be ignited by a position transducer of a rotor and a control pulse device, as described for the embodiment of FIG. 1. In addition, although the load object has been shown directly connected to the load taps of the equipment, it should be understood that the connection may be made through a transformer.

Furthermore, it should be appreciated that the apparatus of the invention is not limited to supplying current to the power windings of a synchronous machine, but may also be used to supply other load objects that are capable of supplying reactive power.

The invention may be embodied in other specific forms without departing from its spirit or essential characteristics. The present embodiments are, therefore, to be considered in all respects as illustrative and not restrictive, the scope of the invention being indicated by the claims rather than by the foregoing description and all changes which come within the meaning and range of the equivalents of the claims are therefore intended to be embraced therein.

What is claimed is:

1. An improved current supply apparatus of a type wherein first and second power connectors are connected to a DC current source for supplying an essentially load-independent current having a changing polarity to at least one load object which is capable of supplying reactive power, the improvement comprising:

at least two branch means connected in parallel between said first and second power connectors, each of said branch means having a series connected switching means, tap means and winding means for directing the flow of said driving current in a direction defined by said switching means, said switching means being a load-commutated thyristor, interphase transformer inductor means for holding and magnetically coupling each of the winding means; and means for connecting said at least one load object between at least a tap means of one of said at least two branch means and a tap means of another of said at least two branch means.

2. The apparatus of claim 1 wherein said load object is single phase and two branch means are connected in parallel to supply the single phase load object with driving current, the switching means of each branch means connected at one end to said first power connector and at an opposite end to an associated winding means of said interphase transformer inductor means, said interphase transformer inductor means having a center tap connected to said second power connector.

3. The apparatus of claim 2 wherein said interphase transformer inductor means includes:

a core means having two leg means, each leg means supporting a winding means of a branch means, and a third leg means having an air gap.

4. The apparatus of claim 3 including a third winding means supported on said third leg means and connected to one of said power connectors.

5. The apparatus of claim 1 wherein said interphase transformer inductor means includes a core means having as many legs as the number of said branch means, the winding means of each branch means disposed on one of said legs.

6. The apparatus of claim 5 wherein the core means of said interphase transformer inductor means includes at least one additional leg means having an air gap.

7. The apparatus of claim 6 including an additional winding means supported on said additional leg means and connected to one of said power connectors.

8. The apparatus of claim 1 wherein each said thyristor is periodically ignited to an on-state by a control means.

9. An improved current supply apparatus of a type wherein first and second power connectors are connected to a DC current source for supplying essentially load-independent current with a changing polarity to a plurality of load objects which are capable of supplying reactive power, the improvement comprising:

a plurality of partial connection means connected in series between said first and said second power connectors, each of said partial connection means including, at least two branch means connected in parallel to supply driving current to at least one particular load object, each branch means having a series connected switching means, tap means and winding means for directing the flow of driving current in a direction defined by the switching means, said switching means being a load-commutated thyristor, interphase transformer inductor means for holding and magnetically coupling each winding means, and means for connecting said at least one particular load object between at least a tap means of one of said at least two branch means and a tap means of another of said at least two branch means.

10. The apparatus of claim 9 wherein said load objects are power windings of a synchronous machine.

* * * * *